Figure 1:
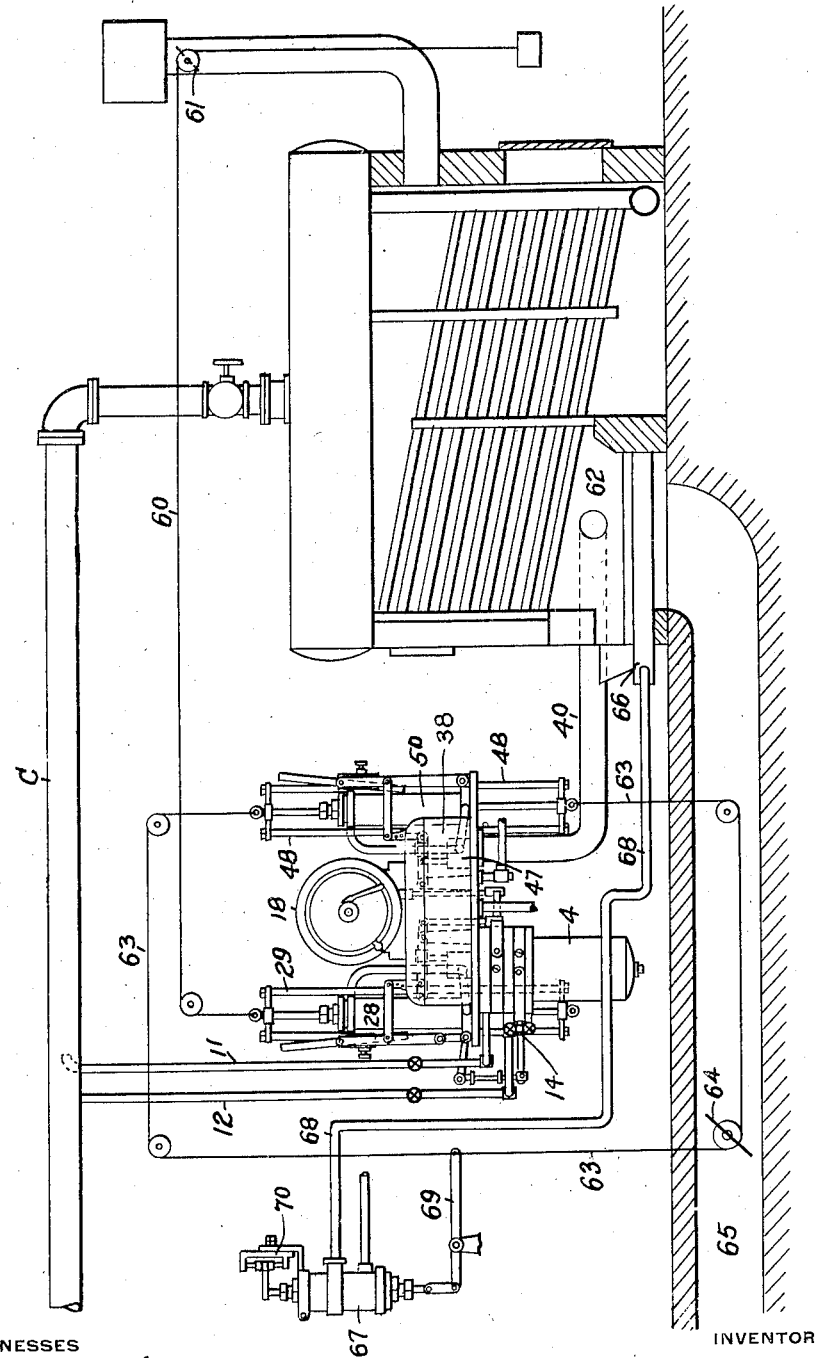

J. M. HOPWOOD.
CONTROLLING COMBUSTION BY FLOW AND PRESSURE.
APPLICATION FILED SEPT. 20, 1918.

1,338,923.

Patented May 4, 1920.
5 SHEETS—SHEET 1.

WITNESSES

INVENTOR
John M. Hopwood
by Dennis S. Wolcott
atty

J. M. HOPWOOD.
CONTROLLING COMBUSTION BY FLOW AND PRESSURE.
APPLICATION FILED SEPT. 20, 1918.

1,338,923.

Patented May 4, 1920.
5 SHEETS—SHEET 4.

WITNESSES

INVENTOR

J. M. HOPWOOD.
CONTROLLING COMBUSTION BY FLOW AND PRESSURE.
APPLICATION FILED SEPT. 20, 1918.

1,338,923.

Patented May 4, 1920.
5 SHEETS—SHEET 5.

WITNESSES
J. Herbert Bradley.

INVENTOR
John M. Hopwood
by Dennis S. Wolcott
atty

UNITED STATES PATENT OFFICE.

JOHN M. HOPWOOD, OF DORMONT, PENNSYLVANIA.

CONTROLLING COMBUSTION BY FLOW AND PRESSURE.

1,338,923.  Specification of Letters Patent.  Patented May 4, 1920.

Application filed September 20, 1918. Serial No. 254,975.

*To all whom it may concern:*

Be it known that I, JOHN M. HOPWOOD, residing at Dormont, in the county of Allegheny and State of Pennsylvania, a citizen of the United States, have invented or discovered certain new and useful Improvements in Controlling Combustion by Flow and Pressure, of which improvements the following is a specification.

The invention described herein has reference to the regulation of combustion in furnaces for generating steam or other products whereby the stack damper or the damper controlling the exit of the products of combustion from the furnace is regulated by and in accordance with the combined variations of the flow and pressure of steam or other product from the generator, and the feed of the fuel and air for combustion is regulated by and in accordance with variations of the pressure of the gases in the furnace.

And further, regulation from pressure consists in accelerating the rate of combustion so as to increase the pressure in the generator to a point beyond which it is not advisable to go, and by such increase in pressure bring about a slower rate of combustion, so as to decrease the pressure in the generator to a point below which it is not advisable to go.

This cycle of operation will keep the pressure within the generator between certain pre-determined bounds, but in doing so, subjects all parts of the furnace and generator to a wide range of continually changing temperatures, the disadvantages of which will be readily apparent to those skilled in the art.

Changes in pressure in the generator have no direct bearing on the rate at which the product is generated. In other words, pressure variations of the same amplitude can take place regardless of the rating at which the generator is operated. It will therefore be seen that with pressure regulation on a generator that is called upon to operate at ratings ranging between 75% of rating and 250% of rating, that the following conditions arise.

Assuming the pressure regulator to be sensitive to changes in pressure of 2 pounds above and 2 pounds below a predetermined point, should the pressure fall the 2 pounds below the predetermined pressure and the generator be operating around 250% of its rating, then the pressure regulator will tend to speed up the operations involved in the combustion of the fuel to their utmost capacity, and keep them thus speeded up until a change in pressure upward takes place.

If the generator is operating at only 75% of rating, and the same pressure drop takes place, the operations involved in the combustion of the fuel will be speeded up in the same rate that they were speeded up for the 250% of rating. Thus it will be seen that if the regulator be set for maximum conditions, the same amount of fuel will be fed into the furnace of the boiler operating at the lower rating as into the furnace of the boiler operating at the higher rating.

Fuel for combustion and air for supporting same are not and should not be introduced into a furnace in proportion to the pressure in the generator except under conditions hereinafter described, but should be introduced in proportion to the rate at which the steam or other gaseous products flow from the generator.

It is the object of this invention to utilize this flow for regulating the introduction of fuel and air and controlling the exit of the products of combustion, and further, since a uniform pressure within the generator is desirable, to supplement such regulation by changes in pressure, should they take place.

The fact that there may be a change in the rate of flow of steam from the boiler without any material change in the static pressure of the steam and also that a change in the pressure will in most cases be due to changes in flow, the advantages of the invention described herein, whereby a regulation in accordance with changes in pressure and the rate of flow is effected, will be apparent as compared with prior methods of regulating combustion wherein the regulation is dependent solely upon variations of static pressure or solely upon flow.

It will be understood that the mechanism controlling the stack damper will be adjusted either directly or indirectly to increase combustion both by a reduction in the rate of flow and a drop in static pressure while an increase of static pressure and an increase in the rate of flow will each of them bring about a reduction of combustion.

Figure 2:
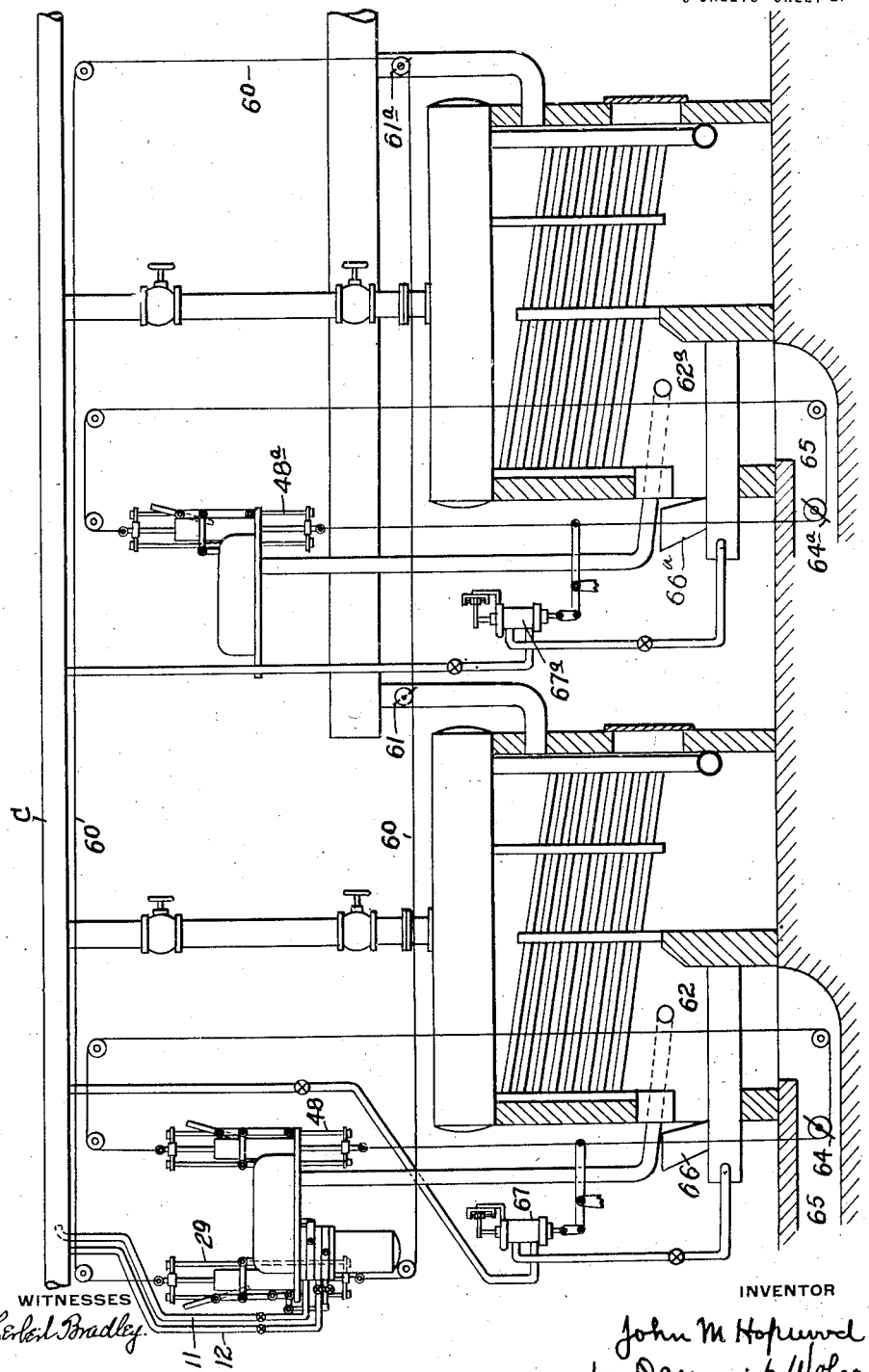
Figure 3:
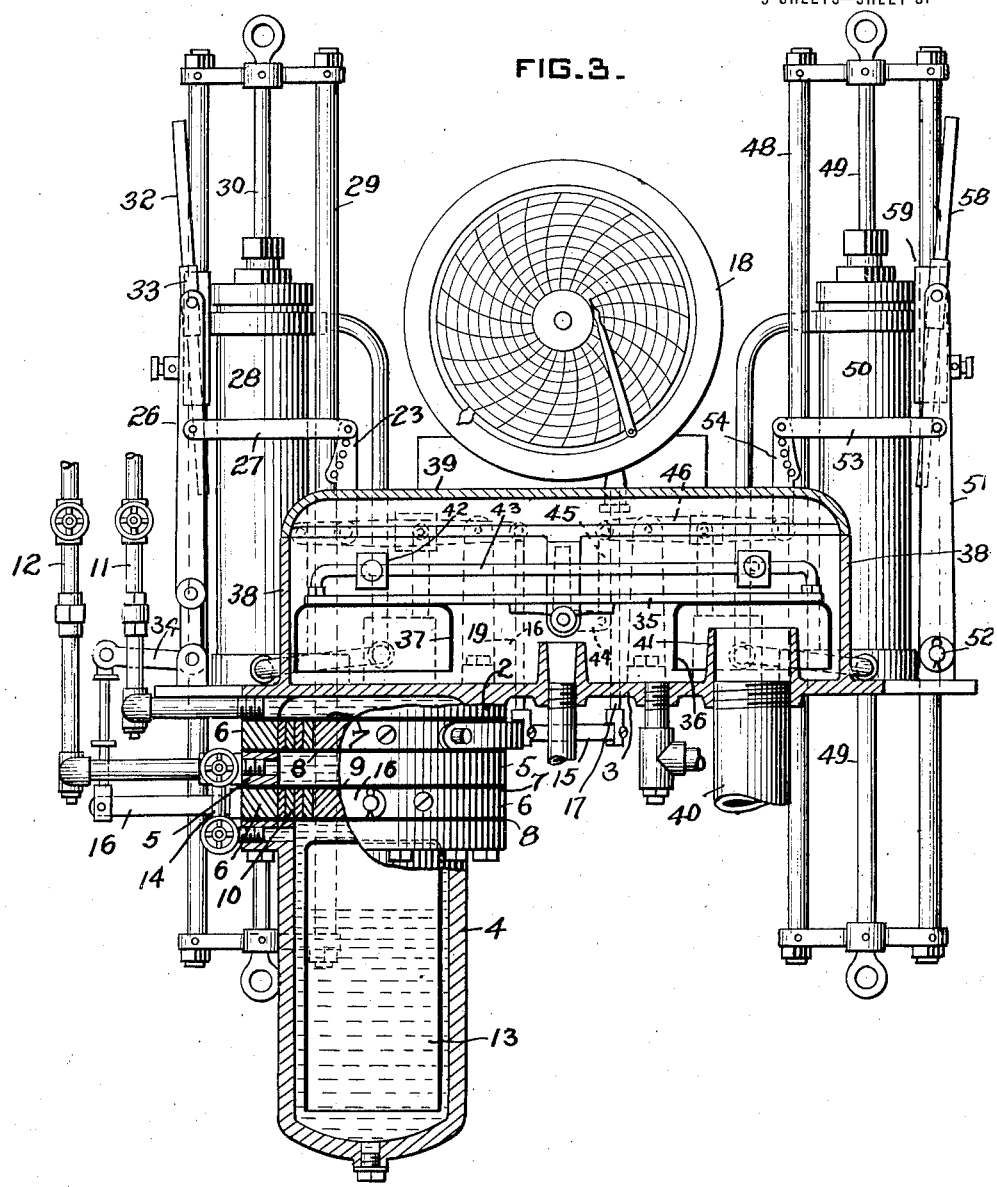
Figure 4:
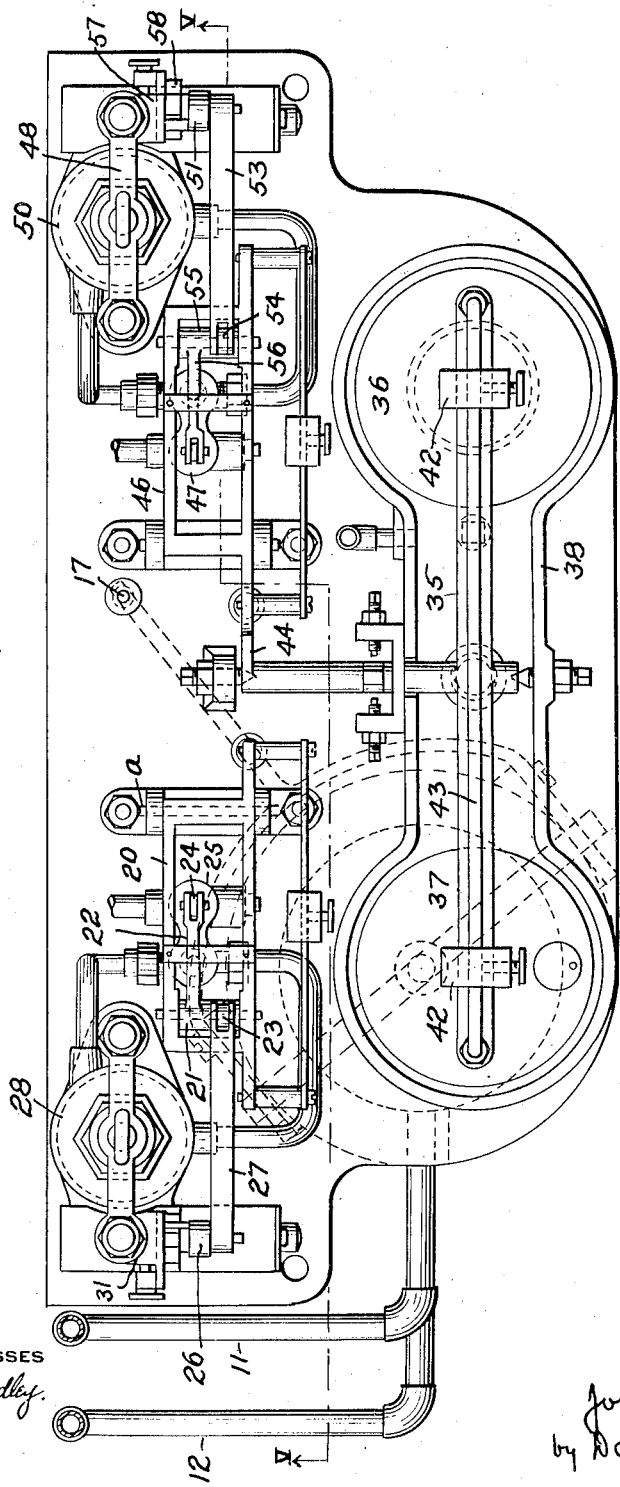

In the accompanying drawings forming a part of this specification, Figure 1 is a diagrammatic view showing the combination of a boiler and combustion regulating mechanism; Fig. 2 is a view similar to Fig. 1 showing the manner of combining combustion regulating mechanism with a plurality of boiler units; Fig. 3 is a view partly in elevation and partly in section of the regulating mechanism on an enlarged scale; Fig. 4 is a top plan view of the mechanism shown in Fig. 3, the tank cover being removed; and Fig. 5 is a sectional view on a plane indicated by the line V—V, Fig. 4.

Figure 5:
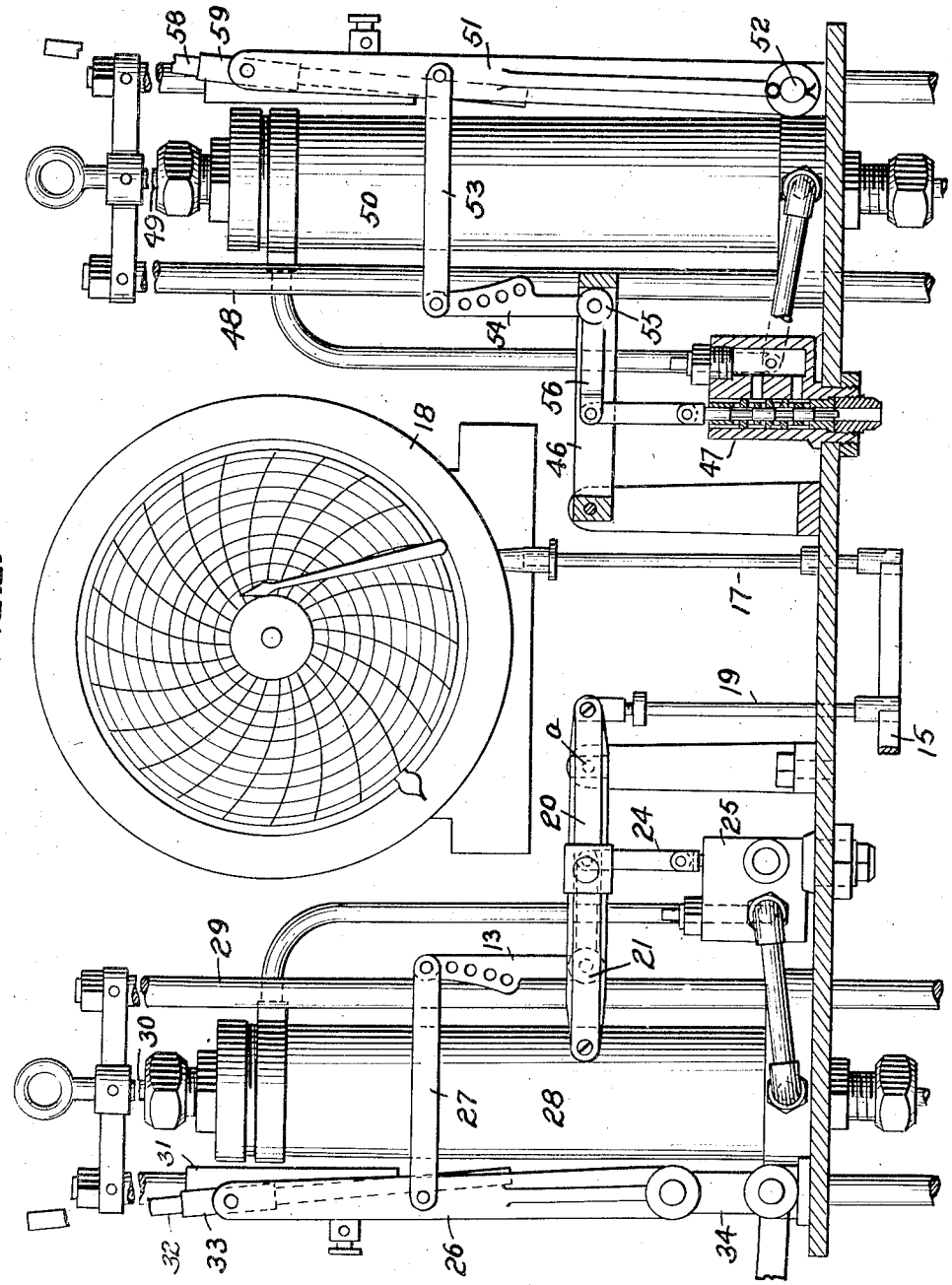

In order to utilize the variations in the rate of flow and pressure of the stream of fluid for shifting the stack damper or dampers as herein described, it is preferred to employ an apparatus shown in Figs. 3, 4, and 5 embodying two diaphragms, one shiftable by variations in the dynamic pressure of a flow of steam from one or more boilers and the other by variations of the static pressure only. The diaphragms are arranged intermediate a cap piece 2 preferably formed integral with the bed plate 3 of the mechanism, and a shell 4, the diaphragms being spaced a suitable distance apart by an annulus 5. Each diaphragm is preferably constructed of a ring 6 arranged between flexible members 7 and 8, a central transmitting block 9 and a series of rings 10 arranged between the block and the spacing rings 6, as described and claimed in Letters Patent No. 1,094,116, dated April 21st, 1914 to Francis H. Brown. The chamber above the upper diaphragm is so connected by a pipe 11 to a pipe or conduit C connected to one or more boilers that the upper side of the diaphragm will be subjected to static pressure modified by the dynamic pressure of the stream flowing from the boiler or boilers while the chamber intermediate the diaphragms is so connected by a pipe 12 to the pipe or conduit C that a pressure equal to and varying with the static pressure in the pipe or conduit will be maintained therein. The underside of the lower diaphragm will be subjected to a constant pressure substantially equal to the normal working pressure desired in the boiler or boilers. This pressure is applied through a fluid cushion formed in the shell 4 in which is placed an inverted cup 13 and the shell filled with a suitable liquid. In charging the shell with liquid, air will be entrapped in the cup, thereby forming a resilient cushion operative on the underside of the lower diaphragm. In order that the desired working pressure may be established in the shell, the pipe 12 which is in communication, as shown in Fig. 1, with the outlet pipe of the boiler or boilers, is connected by a valved branch pipe 14 to the interior of the shell. As soon as the desired pressure has been established in the shell, the valve of the branch 14 is closed so that thereafter the underside of the under diaphragm will be subjected to a constant but yielding pressure substantially equal to the normal working pressure in the boiler. The blocks 9 of the diaphragms are operatively connected to the respective levers 15 and 16, as shown and described in the patent above referred to.

As in the construction described, the upper diaphragm is subjected on both sides to the same static pressure as in the pipe or conduit C, any changes in such pressure will not have any effect thereon, but as the pressure on the upper side is the static pressure plus or minus the dynamic pressure dependent on the arrangement of the Pitot tube in the pipe C, any change in the rate of flow of the steam in the pipe C will cause an incremental movement of the diaphragm proportional to such change in flow. Hence by connecting the lever 15 by a rod 17 to a suitable indicating and recording mechanism 18, an efficient flow meter is formed.

The lever 15 is connected by a rod 19 to a frame 20 pivotally mounted at $a$ and in the frame is mounted a shaft 21 provided with arms 22 and 23. The arm 22 extends toward the pivotal point of the frame and is connected to a stem 24 of the movable member of the valve mechanism 25, preferably of the construction shown in cross section to the right in Fig. 4 and fully shown and described in patent to F. H. Brown No. 1,098,935, dated June 2, 1914. The arm 23 is connected at a point adjacent to its upper end to a swinging member 26 by a link 27, so that when the frame 20 is rocked the arm 22 will be moved with it, thereby shifting the valve to admit steam to the upper or lower end of a cylinder 28 to raise or lower the piston of such cylinder and with it the frame 29 connected at its opposite ends by cross bars to the piston rod 30. On the frame is secured a block 31 on which is adjustably mounted a bar 32 which can be shifted by suitable mechanism to any desired angle with the axis of the cylinder 30. On this rod is slidably mounted a shoe 33 pivotally connected to the upper end of the swinging member 26 which is pivotally mounted at its lower end. When, by the shifting of the movable member of the valve mechanism 25, the frame 29 is moved up or down, the rod 32 will be caused to slide along the shoe and thereby shift the upper end of the swinging member 26 an amount proportional to the angle of the rod or bar 32 to the axis of the cylinder. By this movement of the swinging member the arm 23 is shifted and by it the arm 22, in a direction opposite to that of the previous movement of the frame 20, thereby closing the valve without any movement of the frame. This operation is repeated, i. e., the valve 25 opened in one direction or the other by a movement of the upper diaphragm due to variations in the rate of flow and by a partial movement of the piston of cylinder 30 following such opening of the valve 25, the valve is again closed by the movement of the swinging member 26.

As in the operation of steam power plants, the flow of steam from the boiler or boilers may be constant, but the pressure may vary, and in order to maintain the pressure substantially constant, provision is made for shifting the frame 29 which controls the stack damper in accordance with any changes from a predetermined or normal static pressure in the outlet pipe from the boiler or boilers. As the pressure in the pipe C changes, a corresponding change will be produced in the chamber intermediate the diaphragms as well as in the chamber above the upper diaphragm, but if there has been no change in flow, the changes of static pressure in the chamber above the upper diaphragm will not have any effect. A change of static pressure in the intermediate chamber, as for example a drop in pressure in the intermediate chamber, will permit the constant pressure below the lower diaphragm to operate to raise the latter. This movement of the diaphragm will shift the outer end of the lever 16 downwardly and thereby shift the bell crank lever 34 so as to throw the arm to which the lower end of the swinging member 26 is pivoted, inwardly; this movement of the swinging member will shift the arms 22 and 23 so as to operate the movable member of the valve mechanism 25 to so admit steam to the cylinder as will cause such a movement of the frame as will open the stack damper and thereby permit a freer escape of products of combustion from the furnace of the boiler and a consequent reduction of pressure of the gases posterior to the fuel bed. In case the pressure in the intermediate chamber should exceed that of the fluid cushion in the shell 13, the lower end of the swinging member 26 will be moved outwardly, thereby causing reverse movement of the pilot valve. It will be understood that where the pilot valve is shifted by a movement of the frame 20 or the bell crank lever 34, there will be a compensating movement for closing such valve upon a small or incremental movement of the piston in cylinder 30.

It will be understood that the mechanisms controlling combustion such as shifting the stack damper, stoking mechanism, and devices controlling the feed of air, will be adjusted either directly or indirectly to increase combustion both by a reduction in the rate of flow and a drop in static pressure while an increase of static pressure and an increase in the rate of flow will each of them bring about a reduction of combustion.

The arrangement shown in Fig. 3 and preferably included upon the base plate, includes mechanism operative by variations of pressure in the furnace for effecting the operation of a pilot valve and for its control substantially in the manner hereinbefore described. A lever 35 has secured at its ends inverted cups 36 and 37 which are immersed to a suitable extent in liquid contained in a tank 38, having a removable cover 39. A pipe or tube 40 leading from the fire box of the boiler is connected to a nozzle 41 projecting into one of the cups, as 36, and as the lower end of the inverted cup is sealed by the liquid any changes of pressure in the furnace will cause a corresponding shifting of the lever 35. The cup 37 is employed principally as a dash pot to prevent sudden movements of the lever and the latter is provided with weights 42 adjustably mounted on a rod 43. To the shaft of the lever 35 is secured an arm 44 having its outer end connected by a link 45 to the frame 46, similar in construction and operation to the frame 20 and adapted to shift a pilot valve 47 which in turn controls the admission of fluid pressure to a cylinder 50 having its piston rod 49 connected to a frame 48. In the construction shown at the right of Figs. 3, 4 and 5 and employed for controlling the shifting of the fuel and draft feed mechanism by and in accordance with furnace pressure, the swinging member 51 is mounted on a fixed pivot pin 52 at its lower end and is connected by a link 53 to an arm 54 of the rocking shaft 55 which is also provided with an arm 56 connected to the stem of the pilot valve. On the frame 48 is secured a block 57 having a bar 58 so supported thereon as to be angularly adjustable with reference to the ends of the cylinder, and on said rod is slidably mounted a shoe 59 pivotally connected to the upper end of the swinging member 51. The operation of this mechanism is controlled by variations in furnace pressure and its movements are incremental and proportional to such changes of pressure.

In employing the apparatus hereinbefore described for the regulation of the operations of shifting the stack damper feeding fuel to the furnace and the supplying of air for the support of combustion, frame 29 is connected by any suitable means, such for example as the cord or chain 60, to the stack damper 61 so that such damper will be shifted in the direction of open or closed position as the rate of flow or the static pressure in the outlet pipe C of the boiler vary. As hereinbefore described, the movement imparted to the frame 29 is incremental and hence the damper 61 in lieu of moving from closed to open position, or vice versa, will move in one direction or the other, a small amount at a time, or incrementally. The opening or closing of this stack damper will vary the pressure of the gases in the furnace chamber 62 which as hereinbefore described is connected by a pipe 40 to a nozzle 41 projecting up into and above the water seal of the inverted cup 36. As the pressure in the furnaces rises or falls, a corresponding movement will be imparted to the lever 35 carrying such cup and the movement of this lever will impart a proper movement to the movable member of the pilot valve mechanism 47, and by the shifting of this valve, fluid pressure is admitted to the cylinder 50 at one end or the other, dependent upon whether the pressure in the furnace is above or below the pressure desired to effect a corresponding movement of the frame 48 which, as hereinbefore described, is carried by the rod of the piston in the cylinder 50. This frame is connected by a cord 63 or other suitable means to a valve or damper 64 in the air conduit 65 through which air is fed to the underside of the bed of fuel. In case the pressure in the furnace rises, the frame 48 will be shifted so as to move the valve 64 toward closed position, the movement of this valve corresponding to that of the frame which as hereinbefore described, is incremental.

The frame 48 is also suitably connected to a mechanism controlling the feed of fuel to the furnace. In the construction shown, fluid pressure means are employed for operating the stoking mechanism 66 and the flow of fluid pressure to the stoking mechanism is controlled by roto-reciprocating valve mechanism 67 such as shown and described in Patent No. 1,247,217, dated November 20th, 1917, to Francis H. Brown. This valve mechanism as described and shown in the patent referred to, consists of an external shell adapted to be connected to a source of supply of fluid under pressure and to the stoking mechanism, the latter connection being made by a pipe 68. Within this shell is arranged an inverted cup which is adapted to be reciprocated by a lever 69 or other suitable means, and mechanism indicated at 70 is employed for rotating this valve when shifted longitudinally, whereby a very accurate adjustment of the flow of fluid to the stoking mechanism is obtained. The lever 69 for operating the movable member of the roto-reciprocating valve is connected to the rope or chain 63 which, as hereinbefore described, is connected to the frame 48.

The movements of the stack damper, the valve controlling the flow of air under pressure to the furnace and of the stoking mechanism are as hereinbefore described, wholly incremental, the movement of their motors being incremental.

In Fig. 2 the controlling mechanism is shown for regulating a plurality of units in a boiler plant. In this mechanism the stack dampers 61, 61ᵃ, etc., of the several units are regulated by and in accordance with the changes of pressure or the rate of flow or both of steam flowing through a common conduit C connected to all of the units. The stack dampers are connected to the frame 29 by a cord or chain 60 passing around suitable guide pulleys so that upon any change whether of static or dynamic pressure in the steam flowing through the common conduit C the valves or dampers 61, 61ᵃ will be correspondingly shifted. The shifting of these valves or dampers will cause a change of the pressure of gases in the several furnaces 62, 62ᵃ, of the units, and this change of pressure in the furnaces of the several units is utilized in controlling the regulation of the feed of fuel and of air to the respective furnaces. The valve or damper 64 in the air conduit 65, for supplying air to the furnace 62 is connected to a frame 48 and the roto-reciprocating valve 67 controlling the flow of fluid pressure to the stoking mechanism of the furnace 62 is also operated by the same frame. In order to effect the control of the flow of air and the feed of fuel to the furnace 62ᵃ an apparatus similar to that shown to the left in Fig. 3 is employed and the connections of the frame 48ᵃ of this second mechanism to the air damper 64ᵃ and to the roto-reciprocating valve 67ᵃ controlling the flow of steam to the stoking mechanism 66ᵃ are similar to those hereinbefore described. Any change in the rate of flow in the pipe or the common conduit C from a plurality of units will as hereinbefore described, effect a change in the position of the upper diaphragm shown in Fig. 3, and any change of static pressure in the steam flowing through the pipe or conduit will cause a movement of the lower diaphragm. This mechanism is so constructed and arranged that a decrease in the rate of flow and a drop of pressure of the steam will operate to effect identical adjustment of the stack damper and an increase of rate of flow and an increase of static pressure will also operate in the same direction. In case there should be a simultaneous decrease of flow and decrease of pressure, the action of the two diaphragms will be supplemental one to the other.

This method is especially adapted to conditions where all steam generated passes a given point on its way to steam consuming devices and when stokers are or can be easily driven separately. A marked advantage of the method is that all boilers instantly and simultaneously respond to any variations of the general demand for steam without waiting for or depending upon changes in pressure; while the air supply for combustion and feed of fuel are automatically adjusted and controlled by and in accordance with this demand, they are so modified by furnace conditions so as to maintain a proper relation between fuel supply and air supply for combustion.

When installing mechanism for the practice of the invention described herein, the position which the stack damper should occupy under normal working conditions is determined and the regulating mechanism is so adjusted that the predetermined or normal static pressure in the boiler will, operating through the regulating mechanism, hold the damper in such position. After such adjustment, variations in flow will cause a fluctuation of the piston of cylinder 28 from its normal position, the range of movement or of fluctuation being proportional to the changes in the rate of flow of steam from the boiler. In case of a change in static pressure, the piston will assume another position and changes of flow will produce fluctuations of the piston relative to its new position. In other words the field of movement of the piston due to changes of flow will be largely determined by the static pressure of the steam.

As is well known, the pressure of the steam and the rate of flow of steam from a boiler are the factors which determine the horse power developed by a boiler, and hence it is characteristic of the invention described herein that regulation of combustion is effected in accordance with the horse power developed.

While the invention has been described and shown in connection with apparatus for the generation of steam, it will be apparent that the improvements can be used for controlling combustion with vapor generators generally.

I claim herein as my invention:

1. The method herein described of regulating the generation of heat for vapor generators which consists in regulating the escape of products of combustion by and in accordance with variations in the dynamic and static pressures of the fluid flowing from the generator to a point of use and regulating the supply of fuel and air for combustion by and in accordance with changes in pressure in the furnace of the generator.

2. The method herein described of regulating the generation of heat in vapor generators which consists in regulating the escape of products of combustion from the furnace of the generator by and in accordance with variations in the rate of flow and the static pressure of the vapor flowing from the generator and regulating the supply of fuel and air for combustion by and in accordance with changes in pressure of gases in the combustion chamber.

3. The method herein described of regulating the generation of heat for a plurality of vapor generator units which consists in regulating the discharge of products of combustion from the furnaces of the several units by and in accordance with variations in the rate of flow of vapor from and the normal static pressure of vapor in the generators and regulating the feed of fuel and the supply of air for combustion to each of the units by and in accordance with the pressure of the products of combustion in the furnaces of the respective units.

4. The combination of a generator having a furnace, means for controlling the flow of products of combustion from the furnace of the generator, a motor adapted to be shifted by and in accordance with changes in the rate of flow of fluid from the generator and the static pressure of vapors in the generator for shifting the means for controlling the flow of products of combustion from the furnace, means for feeding fuel, means for regulating the flow of air to the furnace and a motor operated by and in accordance with changes in the pressure of gases in the combustion chamber of the generator for operating the fuel feeding means and air regulating means.

5. The method herein described of regulating the generation of heat in a vapor generator which consists in regulating the discharge of gases and products of combustion from the furnace of the generator by and in accordance with variations in the rate of flow of vapor from and the normal static pressure of vapor in the generator and regulating the supply of fuel to the furnace by and in accordance with the pressure of products of combustion in the furnace.

6. The method herein described of regulating the generation of heat in vapor generators which consists in regulating the escape of products of combustion from the furnace of the generator by and in accordance with variations in the rate of flow of vapors from and the normal static pressure of vapors in the generator and regulating the supply of air to the combustion chamber by and in accordance with changes in the pressure of gases in the combustion chamber.

7. The method herein described of regulating the combustion in the furnace of a vapor generator which consists in regulating the escape of products of combustion from a furnace, in the same direction by and in accordance with changes in the rate of flow of steam from the generator and by and in accordance with changes in the static pressure of the steam, whereby a variation in the rate of flow of steam in one direction (up or down) will effect similar regulation as a variation of static pressure in the opposite direction (down or up).

8. The method herein described of regulating combustion in a furnace which consists in feeding fuel to the furnace, supplying air for supporting combustion in the furnace and regulating the feed of fuel and the air supply by and in accordance with the pressure of gases in the furnace.

9. In a system comprising a vapor generator having a furnace, means for controlling the discharge of products of combustion from the furnace, a motor for shifting such means, a motor controlling means and fuel feeding means, the method of controlling the furnace operations which consists in regulating the said motor controlling means by and in accordance with variations of an effect which results from the independently exerted actions of variations in the static pressure and variations of the vapor flow from the generator, and regulating the feed of fuel by and in accordance with variations of pressure of the gases in the furnace of the generator.

10. In a system comprising a vapor generator having a furnace, means for controlling the discharge of products of combustion from the furnace, a motor for shifting such means, a motor controlling means, air and fuel feeding means, the method of controlling the furnace operations which consists in regulating the said motor controlling means by and in accordance with variations of an effect which results from the independently exerted actions of variations in the static pressure and variations of the vapor flow from the generator, and regulating the feed of air and fuel to the furnace by and in accordance with variations of pressure of the gases in the furnace of the generator.

11. A mechanism for controlling one of the herein described operations involved in the combustion of fuel in a furnace, such as feeding fuel, feeding air and the discharge of products of combustion, having in combination a motor, mechanism for controlling the operation of the motor, means operative by a plurality of independently variable fluid pressures for so shifting the controlling mechanism as to cause the operation of the motor, and a compensating mechanism operative by the motor for shifting the controlling mechanism to check said operation after a predetermined movement of the motor.

12. A mechanism for controlling one of the herein described operations involved in the combustion of fuel in a furnace such as feeding fuel, feeding air, and the discharge of products of combustion having in combination a motor operative by fluid pressure, mechanism for controlling the operation of the motor, means operative by a plurality of independently variable fluid pressures for so shifting the controlling mechanism as to cause the operation of the motor and a compensating mechanism operative by the motor for shifting the controlling mechanism to check said operation after a predetermined movement of the motor.

In testimony whereof, I have hereunto set my hand.

JOHN M. HOPWOOD.